US012403484B2

(12) United States Patent
Askins, Jr. et al.

(10) Patent No.: US 12,403,484 B2
(45) Date of Patent: Sep. 2, 2025

(54) SPRAY NOZZLE

(71) Applicant: BELCO TECHNOLOGIES CORPORATION, St. Louis, MO (US)

(72) Inventors: Dale Askins, Jr., Pearland, TX (US); Kent DeFosset, Sunset Hills, MO (US); Scott T. Eagleson, North Plainfield, NJ (US); Edward Hutter, Randolph, NJ (US); Wayne A. Patterson, Lebanon, NJ (US); Mark C. Puett, Olathe, KS (US)

(73) Assignee: Belco Technologies Corporation, St. Louis, MO (US)

( * ) Notice: Subject to any disclaimer, the term of this patent is extended or adjusted under 35 U.S.C. 154(b) by 422 days.

(21) Appl. No.: 17/979,943

(22) Filed: Nov. 3, 2022

(65) Prior Publication Data

US 2024/0149282 A1    May 9, 2024

(51) Int. Cl.
*B05B 1/04* (2006.01)
*B01D 47/06* (2006.01)
(Continued)

(52) U.S. Cl.
CPC .............. *B05B 1/046* (2013.01); *B01D 47/06* (2013.01); *B01D 53/1456* (2013.01);
(Continued)

(58) Field of Classification Search
CPC ..... B05B 1/046; B05B 1/3426; B05B 1/3405; B01D 47/06; B01D 53/1456; B01D 53/18;
(Continued)

(56) References Cited

U.S. PATENT DOCUMENTS 1,511,940 A * 10/1924 Walter .................. B05B 1/3426
239/468
1,730,708 A * 10/1929 Wittenberg ........... B05B 1/3426
239/471
(Continued)

FOREIGN PATENT DOCUMENTS

CN     104138812 A  * 11/2014    ............... B05B 1/06
CN     203955389 U  * 11/2014
(Continued)

OTHER PUBLICATIONS

Confuorto "Wet Scrubbing Systems" Belco Technologies Corporation (Year: 2013).*
(Continued)

*Primary Examiner* — Stephen Hobson (57) ABSTRACT

Disclosed herein is a spray nozzle comprising an annular head, a hollow neck, and a liquid inlet line disposed in the hollow neck. The annular head comprises a liquid inlet orifice, first and second external flow diversion surfaces, an interior circumferential channel, and an ejector. The ejector comprises a substantially smooth surface having a fixed width, the ejector extending from the point of contact with the interior circumferential channel such that in the extending direction, the substantially smooth surface increases in distance from the interior circumferential channel. Also disclosed herein is an apparatus comprising at least one such spray nozzle, and processes comprising using at least one such spray nozzle.

19 Claims, 8 Drawing Sheets

(51) Int. Cl.
  *B01D 53/14* (2006.01)
  *B01D 53/18* (2006.01)
  *B05B 1/34* (2006.01)
  *B05D 1/14* (2006.01)

(52) U.S. Cl.
  CPC ............ *B01D 53/18* (2013.01); *B05B 1/3426* (2013.01); *B05D 1/14* (2013.01)

(58) Field of Classification Search
  CPC .......... B01D 2252/10; B01D 2252/103; B01D 53/78; B01D 2259/124; B01D 53/79; B05D 1/14
  See application file for complete search history.

(56) References Cited

U.S. PATENT DOCUMENTS

| | | | | |
|---|---|---|---|---|
| 2,161,016 A | * | 6/1939 | Carr | B05B 1/3426 239/468 |
| 2,642,950 A | * | 6/1953 | Clark | D21D 5/26 239/548 |
| 3,803,805 A | | 4/1974 | Low | |
| 4,026,475 A | * | 5/1977 | Vicard | B05B 1/3426 239/468 |
| 4,584,147 A | * | 4/1986 | Stehning | B05B 1/3426 261/115 |
| 5,063,034 A | * | 11/1991 | Vicard | B01D 53/56 423/235 |
| 6,294,139 B1 | * | 9/2001 | Vicard | B01D 53/56 423/210 |
| 6,322,617 B1 | * | 11/2001 | Wurz | B05B 1/3421 95/219 |
| 7,175,109 B2 | * | 2/2007 | Schroeder | B05B 1/3426 239/548 |
| 7,214,356 B2 | * | 5/2007 | Hsieh | B01D 53/56 423/235 |
| 7,534,400 B2 | * | 5/2009 | Hsieh | B01D 53/56 422/168 |
| 2005/0008555 A1 | * | 1/2005 | Hsieh | B01D 53/56 422/171 |
| 2007/0029408 A1 | * | 2/2007 | Hewitt | B05B 1/3426 239/488 |
| 2007/0189949 A1 | * | 8/2007 | Hsieh | B01D 53/56 423/235 |
| 2009/0188782 A1 | * | 7/2009 | Genuario | B01D 53/32 204/157.3 |
| 2016/0317964 A1 | * | 11/2016 | Paschke | B01D 21/10 |
| 2018/0154309 A1 | * | 6/2018 | Patterson | F01N 3/20 |
| 2024/0149282 A1 | * | 5/2024 | Askins, Jr. | B01D 53/1456 |

FOREIGN PATENT DOCUMENTS

| | | | |
|---|---|---|---|
| CN | 104056540 B | 10/2015 | |
| CN | 104138812 B | 3/2016 | |
| IN | 203955022 U | 11/2014 | |
| WO | WO-2005014134 A2 * | 2/2005 | ............ B01D 53/56 |
| WO | 2008/100317 A1 | 8/2008 | |

OTHER PUBLICATIONS

"BELCO(R) EDV Wet Scrubbing Systems" Brochure, Sep. 27, 2019.
Confuorto, N. et al., "Clean Generation", DigitalRefining.com, Jun. 2003.
Eagleson, S.T. et al., "Controlling FCCU Emissions", Hydrocarbon Engineering, p. 76-80, Mar. 1999.
Weaver, E.H. et al., "An Update of Wet Scrubbing Control Technology for FCCUS-Multiple Pollutant Control", AM-03-120, NPRA Annual Meeting, Mar. 23-25, 2003, San Antonio, TX.

* cited by examiner

SPRAY NOZZLE

FIELD OF THE DISCLOSURE

The present disclosure is directed to a spray nozzle useful for controlling emissions of SOx, NOx, and particulates in the flue gas from combustion systems, the spray nozzle comprising an annular head comprising an interior circumferential channel and an ejector having a substantially smooth surface and a fixed width.

BACKGROUND

Environmental regulations continue to become stricter regarding flue gases containing SOx, NOx, and particulate generated from the petroleum, power, petrochemical, and other heavy industries. Wet scrubbing is a leading process for removing or controlling such emissions.

A wet scrubbing process typically employs a cylindrical tower as the wet scrubber, in which spray nozzles are located at the tower inlet to provide flue gas quenching as necessary and additional spray nozzles are located within the tower itself to control emissions. The spray nozzles are used to spray a solution, typically consisting of water and at least one reagent such as sodium hydroxide, for absorption of the SOx and other acid gases in the flue gas stream directed to the wet scrubber. In addition to spraying a reagent solution to control emissions in the flue gas, the spray nozzles may also be used to maintain a wet surface on the scrubber internal surface to minimize corrosion. The emissions removal efficiency of the wet scrubber is dependent upon the spray pattern and the droplet size produced by the spray nozzle.

There remains a need for spray nozzles which can improve emissions removal in wet scrubbing processes and which can provide an improved spray pattern. There remains a need for spray nozzles which can provide an improved spray pattern to improve heat removal in wet scrubbing processes. There remains a need for spray nozzles which can provide an improved spray pattern and which are economical to manufacture.

SUMMARY

Disclosed herein is a spray nozzle comprising:
(a) an annular head comprising a liquid orifice, a first external flow diversion surface, a second external flow diversion surface, an interior circumferential channel, and an ejector,
wherein the first and second external flow diversion surfaces each comprise a conical frustum shape;
wherein the interior circumferential channel is disposed between the first and second external flow diversion surfaces and extends from the liquid inlet orifice to the ejector, the interior circumferential channel comprising a first interior wall, a second interior wall opposite the first interior wall, a bottom interior wall, a circumferential channel width, and a continuously reducing depth from the liquid inlet orifice to the ejector, and
wherein the ejector comprises a substantially smooth surface having a fixed width, the ejector extending from the point of contact with the interior circumferential channel such that in the extending direction, the substantially smooth surface increases in distance from the interior circumferential channel;
(b) a hollow neck; and
(c) a liquid inlet line disposed in the hollow neck and in fluid communication with the liquid inlet orifice.

In one embodiment, the fixed width of the substantially smooth surface is at least half that of the circumferential channel width. In another embodiment, the fixed width of the substantially smooth surface is the same or substantially the same as the circumferential channel width.

In one embodiment, the substantially smooth surface of the ejector comprises a curved shape, a planar shape, a series of planar shapes, or a combination thereof.

In one embodiment, the substantially smooth surface of the ejector further comprises a distal edge substantially parallel to the fixed width of the substantially smooth surface. In one embodiment, the first and second external flow diversion surfaces each further comprise a nearer edge situated along the interior circumferential channel, and the distal edge is situated about even with the nearer edge of at least one external flow diversion surface. In another embodiment, the first and second external flow diversion surfaces each further comprise a nearer edge situated along the interior circumferential channel, and the distal edge is situated below the nearer edge of at least one external flow diversion surface. In yet another embodiment, the first and second external flow diversion surfaces each further comprise a nearer edge situated along the interior circumferential channel, and wherein the distal edge is situated above the nearer edge of at least one external flow diversion surface.

In one embodiment, the ejector further comprises a first side and a second side, each side extending from the substantially smooth surface to the first or the second external flow diversion surface or to the bottom interior wall of the circumferential channel, and the first and second sides are each smooth, inclined, or radiused.

In one embodiment, the ejector is disposed above the liquid inlet orifice.

In one embodiment, the first and second interior walls of the interior circumferential channel are substantially parallel to one another. In another embodiment, the first and second interior walls of the interior circumferential channel are not substantially parallel to one another.

In one embodiment, the first and second external flow diversion surfaces are symmetrical to each other. In one embodiment, the first and second external flow diversion surfaces are each disposed along the entire circumference of the annular head.

In one embodiment, the hollow neck comprises a mating region.

Also disclosed herein is a spray nozzle comprising:
(a) an annular head, the annular head comprising:
  (i) a liquid inlet orifice;
  (ii) a first external flow diversion surface and a second external flow diversion surface;
  (iii) an interior circumferential channel; and
  (iv) an ejector;
(b) a hollow neck; and
(c) a liquid inlet line disposed in the hollow neck and in fluid communication with the liquid inlet orifice;
wherein
  both the first and second external flow diversion surfaces are disposed along the entire circumference of the annular head and each external flow diversion surface comprises a conical frustum shape symmetrical to the other;
  the interior circumferential channel is disposed between the first and second external flow diversion surfaces and extends from the liquid inlet orifice to the ejector, the interior circumferential channel comprising a first interior wall, a second interior wall opposite the first interior wall, and a bottom interior wall, a circumferential channel width, and a continuously reducing depth from the liquid inlet orifice to the ejector; and the ejector is disposed above the liquid inlet orifice and comprises a substantially smooth surface having a curved shaped and a fixed width the same as or substantially the same as the circumferential channel width, the ejector extending from the point of contact with the interior circumferential channel such that in the extending direction the substantially smooth surface increases in distance from the circumferential channel.

Additionally disclosed herein is an apparatus for conditioning gases or for controlling emissions of acidic gases, particulates, or acidic gases and particulates from flue gas, the apparatus comprising at least one spray nozzle as disclosed herein.

In one embodiment, the apparatus is a wet scrubber.

Also disclosed herein is a process for conditioning gases or for controlling emissions of acidic gases, particulates, or acidic gases and particulates from flue gas, the process comprising using at least one spray nozzle as disclosed herein.

Corresponding reference characters indicate corresponding components throughout the drawings. Skilled artisans will appreciate that the figures are illustrated for simplicity and clarity and have not necessarily been drawn to scale. For example, the dimensions of some of the elements in the figures may be exaggerated relative to others to help to improve understanding of embodiments.

DETAILED DESCRIPTION

The disclosures of all cited patent and non-patent literature are incorporated herein by reference in their entirety.

As used herein, the term "embodiment" or "disclosure" is not meant to be limiting, but applies generally to any of the embodiments defined in the claims or described herein. These terms are used interchangeably herein.

In this disclosure, a number of terms and abbreviations are used. The following definitions apply unless specifically stated otherwise.

The articles "a", "an", and "the" preceding an element or component are intended to be nonrestrictive regarding the number of instances (i.e. occurrences) of the element or component. There "a", "an", and "the" should be read to include one or at least one, and the singular word form of the element or component also includes the plural unless the number is obviously meant to be singular.

The term "comprising" means the presence of the stated features, integers, steps, or components as referred to in the claims, but that it does not preclude the presence or addition of one or more other features, integers, steps, components, or groups thereof. The term "comprising" is intended to include embodiments encompassed by the terms "consisting essentially of" and "consisting of". Similarly, the term "consisting essentially of" is intended to include embodiments encompassed by the term "consisting of".

Where present, all ranges are inclusive and combinable. For example, when a range of "1 to 5" is recited, the recited range should be construed as including ranges "1 to 4", "1 to 3", 1-2", "1-2 and 4-5", "1-3 and 5", and the like.

As used herein in connection with a numerical value, the term "about" refers to a range of +/−0.5 of the numerical value, unless the term is otherwise specifically defined in context.

It is intended that every maximum numerical limitation given throughout this Specification includes every lower numerical limitation, as if such lower numerical limitations were expressly written herein. Every minimum numerical limitation given throughout this Specification will include every higher numerical limitation, as if such higher numerical limitations were expressly written herein. Every numerical range given throughout this Specification will include every narrower numerical range that falls within such broader numerical range, as if such narrower numerical ranges were all expressly written herein.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As used herein:

The term "annular" means a ring shape formed between two concentric circles which share a common center.

The term "conical frustum" means a shape formed by cutting off the vertex of a cone, the cut being made parallel to the base of the cone.

The term "circumferential" means in a way that encircles.

The term "radial" means arranged like the radii of a circle, diverging in lines from a common center.

The term "distal" means situated away from the point of attachment, specifically the more distant of two things.

The term "smooth" means having an even and regular surface free from perceptible projections, lumps, indentations, threading, or ridges of any type.

The term "conditioning gases" means humidifying and cooling gases.

The term "acidic gases" means gases which can form acidic solutions, i.e. having a pH of less than 7, when mixed with water. As used herein, "acidic gases" include nitric oxide, nitrogen dioxide, hydrogen sulfide, sulfur dioxide, sulfur trioxide, hydrochloric acid, chlorine, and carbon dioxide.

The term "particulates" means minute separate particles, such as soot or catalyst fines.

The term "a curved shape" means a shape which bends in a smooth, continuous way without sharp angles.

The term "a planar shape" means a two-dimensional shape having only width and length.

The term "symmetrical" means having corresponding points when reflected across a central plane containing the annular head of the spray nozzle as defined herein.

Figure 1:
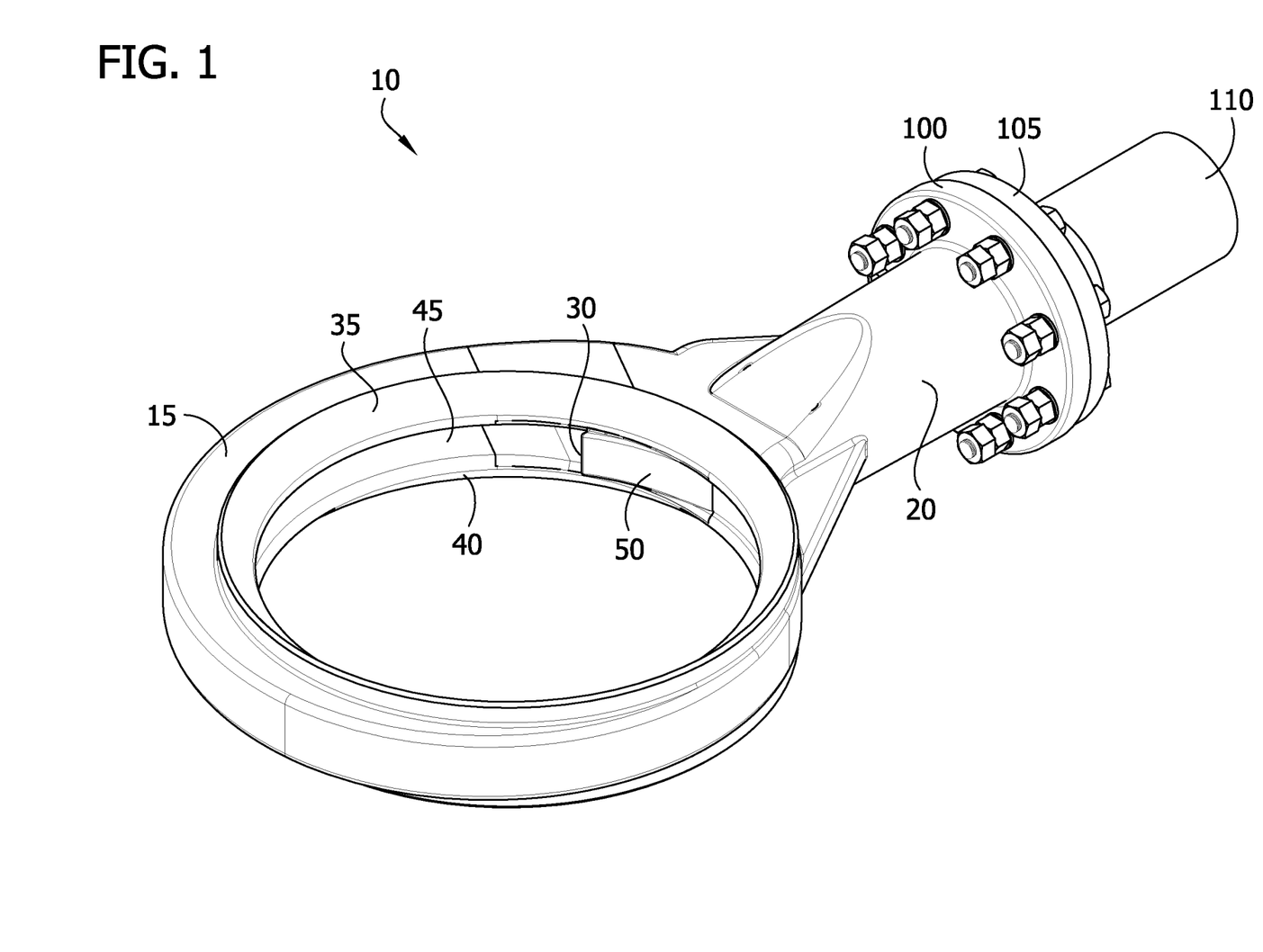
FIG. 1 is a perspective view of one embodiment of a spray nozzle as disclosed herein.

The present disclosure is directed to a spray nozzle, such as the spray nozzle 10 shown in FIG. 1, to an apparatus comprising at least one spray nozzle as disclosed herein, and to processes comprising using at least one spray nozzle as disclosed herein.

One embodiment of a spray nozzle as disclosed herein is shown in FIG. 1. Referring to FIG. 1, the spray nozzle 10 comprises an annular head 15, a hollow neck 20, and a liquid inlet line (not shown) disposed in the hollow neck 20. The annular head 15 comprises a liquid inlet orifice 30, a first external flow diversion surface 35, a second external flow diversion surface 40, an interior circumferential channel 45, and an ejector 50. The liquid inlet line disposed in the hollow neck 20 is in fluid communication with the liquid inlet orifice 30. The first and second external flow diversion surfaces 35 and 40 each comprise a conical frustum shape. The interior circumferential channel 45 is disposed between the first external flow diversion surface 35 and the second external flow diversion surface 40 and extends from the liquid inlet orifice 30 to the ejector 50. The interior circumferential channel 45 comprises a first interior wall, a second interior wall opposite the first interior wall, a bottom interior wall, a circumferential channel width, and a continuously reducing depth from the liquid inlet orifice 30 to the ejector 50. The ejector 50 comprises a substantially smooth surface having a fixed width, and extends from the point of contact with the interior circumferential channel such that in the extending direction, the substantially smooth surface increases in distance from the interior circumferential channel. By "point of contact" is meant the area or line wherein the end of the ejector contacts the end of the interior circumferential channel.

The hollow neck 20 of the spray nozzle comprises a mating region 100, which is used to connect the spray nozzle to the apparatus in which it is situated. The mating region 100 can be connected to a complementary mating region 105 of a pipe 110 or hose contained within an apparatus such as a wet scrubber. Fasteners such as screws or bolts can be used to connect the spray nozzle and the pipe or hose together.

During operation of the spray nozzle, scrubbing liquid is pumped under pressure through a pipe or hose into the liquid inlet line disposed in the hollow neck and is injected tangentially at high velocity through the liquid inlet orifice into the interior circumferential channel. As the scrubbing liquid moves along the interior circumferential channel and onto the ejector, the continuously reducing depth of the channel, in combination with the high velocity of the scrubbing liquid and the design of the ejector, projects the scrubbing liquid as droplets outwardly, circumferentially and radially, from the interior circumferential channel over the first and second external flow diversion surfaces, forming two oppositely directed conical sheets of scrubbing liquid, divided into very fine droplets under the action of centrifugal force, with the interior of the conical sheets being substantially droplet free.

The ejector, at the end of the interior circumferential channel, is the last component of the nozzle that the scrubbing liquid contacts prior to being sprayed outwardly. At the ejector, the scrubbing liquid being sprayed outwardly overlaps with and contacts the scrubbing liquid being sprayed outwardly at the beginning of the interior circumferential channel. To provide full coverage of the gas flow path in a wet scrubber tower, the outward spray pattern at the ejector must overlap and interfere with the outward spray pattern formed at the beginning of the interior circumferential channel, nearest the liquid inlet orifice. With some spray nozzles, the interference may cause an undesirable discontinuity in the spray pattern, for example creating an open area not covered by the spray, or an open area resulting from agglomeration of spray droplets. In contrast, a spray nozzle comprising an ejector as disclosed herein can improve the continuity of the spray pattern at the interface between the beginning spray and the spray at the ejector. Without being bound by theory, it is believed that the ejector as disclosed herein reduces the interference between the spray at the beginning of the interior circumferential channel and the spray at the ejector, resulting in an improved spray pattern. An improved spray pattern is advantageous because it can improve efficiency of emissions removal, and improve efficiency of heat removal during quenching of hot flue gases.

The annular head, hollow neck, and liquid inlet line may be made of metallic or non-metallic materials, such as ceramic, or combinations of metallic and non-metallic materials. Optionally, portions of the nozzle may be partially or fully coated with abrasion-resistant, erosion-resistant, and/or chemical-resistant coatings. Typically, the materials of construction for the annular head, hollow neck, and liquid inlet line are selected for abrasion resistance and chemical resistance appropriate for the intended use of the nozzle.

The first and second external flow diversion surfaces each comprise a conical frustum shape. In one embodiment, the first and second external flow diversion surfaces are symmetrical to each other, and symmetrical spray patterns are produced by the two oppositely directed sheets of scrubbing liquid. In another embodiment, the first and second external flow diversion surfaces are not symmetrical to each other, and asymmetrical spray patterns are produced by the two oppositely directed sheets of scrubbing liquid. In some embodiments, the first and second external flow diversion surfaces are each disposed along the entire circumference of the annular head, that is, through 360 degrees of arc of the annular head, to create a full spray pattern. In other embodiments, the first and second external flow diversion surfaces are each disposed along only a portion of the annular head, for example from about 25 degrees to about 100 degrees of the annular head, to create a corresponding partial spray pattern. In one embodiment, the first and second external flow diversion surfaces each extend beyond the hollow neck. In another embodiment, the first and second external flow diversion surfaces each do not extend beyond the hollow neck. Each external flow diversion surface further comprises a nearer edge, situated along the interior circumferential channel. The first and second external flow diversion surfaces create a hollow cone-shaped spray pattern with the desired droplet size.

Figure 2:
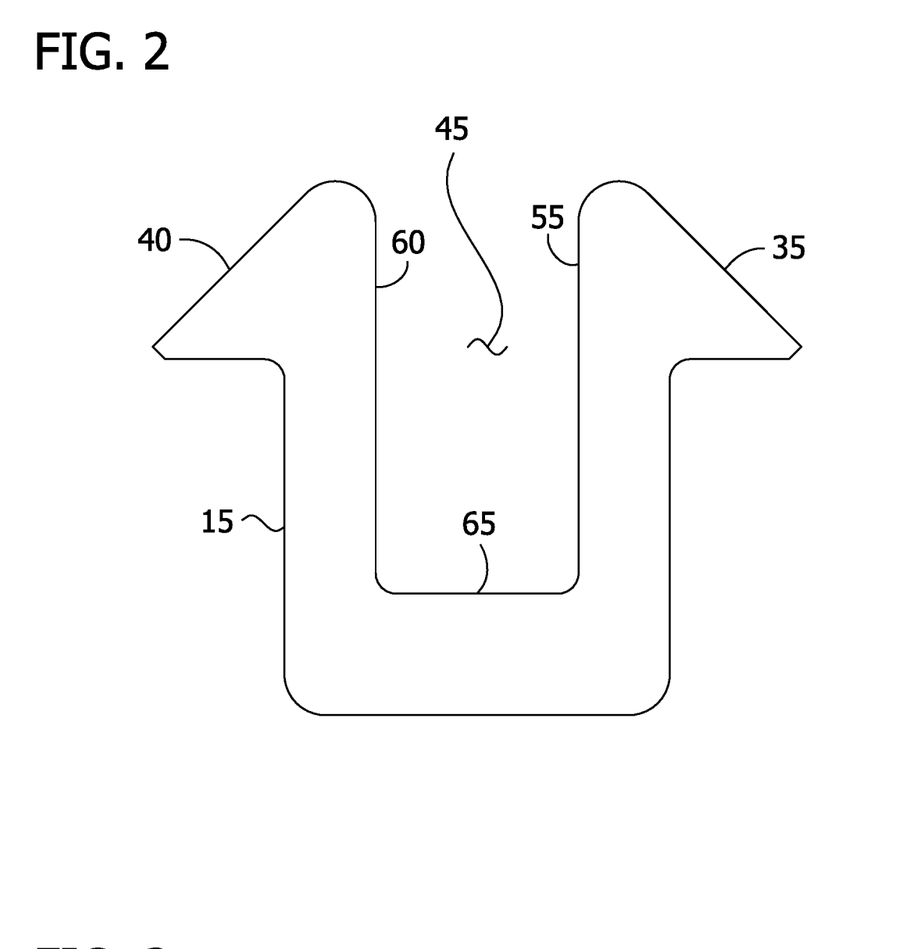
FIG. 2 is a first cross-sectional view of one embodiment of a spray nozzle as disclosed herein, showing a portion of an interior circumferential channel wherein the interior circumferential channel is relatively deep.
Figure 3:
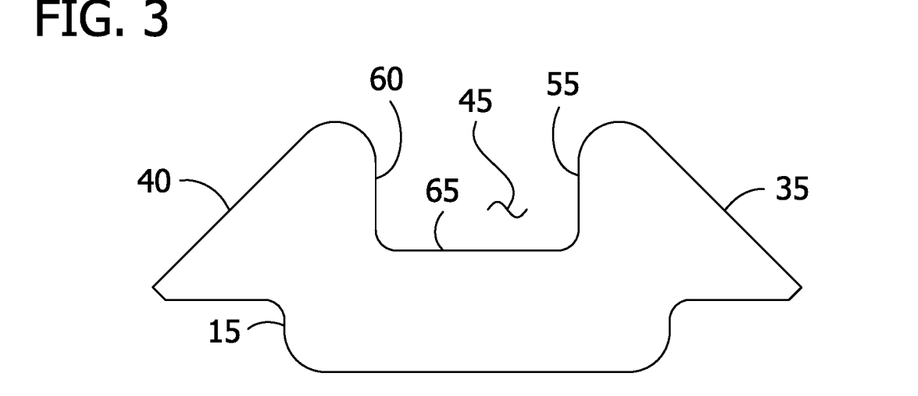
FIG. 3 is a second cross-sectional view of one embodiment of a spray nozzle as disclosed herein, showing a portion of an interior circumferential channel wherein the interior circumferential channel is relatively shallow.

Referring to FIG. 2 and FIG. 3, within the annular head 15, the interior circumferential channel is disposed between the first and second external flow diversion surfaces 35 and 40, respectively, and extends from the liquid inlet orifice to the ejector. The interior circumferential channel 45 comprises a first interior wall 55, a second interior wall 60 opposite the first interior wall, a bottom interior wall 65, a circumferential channel width, and a continuously reducing depth from the liquid inlet orifice to the ejector. By "continuously reducing depth" is meant that the depth of the interior circumferential channel gradually becomes more shallow proceeding from the liquid inlet orifice, where the depth of the interior circumferential channel is greatest, to the point of contact with the ejector, where the depth of the interior circumferential channel is most shallow. FIG. 2 is a cross-sectional view of one embodiment of a spray nozzle as disclosed herein, showing a portion of the interior circumferential channel wherein the continuously reducing depth is at or near maximum, and the interior circumferential channel is relatively deep. FIG. 3 is a cross-sectional view of the same embodiment of a spray nozzle as disclosed herein, showing a portion of the interior circumferential channel wherein the continuously reducing depth is less than maximum and the interior circumferential channel is relatively shallow. At the point of contact with the ejector, the bottom interior wall 65 of the interior circumferential channel 45 is flush and continuous with the ejector.

Due to the continuously reducing depth, the interior circumferential channel is spiral in shape. In one embodiment, the first and second external flow diversion surfaces are each disposed along the entire circumference of the annular head, the interior circumferential channel extends from the liquid inlet orifice through about 360 degrees of arc to the ejector, and the spray pattern produced by the nozzle covers about 360 degrees of arc and forms two conical shapes. In another embodiment, the interior circumferential channel extends from the liquid inlet orifice through less than about 360 degrees of arc to the ejector, for example to a degree of arc from about 90 degrees of arc through about 359 degrees of arc, or from about 90 degrees arc through about 270 degrees of arc, or from about 120 degrees of arc through about 270 degrees or arc, or from about 120 degrees of arc through about 359 degrees of arc, and the first and second external flow diversion surfaces each extend along the circumference of the annular head the same degree of arc, from the liquid inlet orifice to the ejector, as that of the interior circumferential channel, and the spray pattern produced by the nozzle forms two partial conical shapes, the partial conical shapes corresponding to the degree of arc through which the interior circumferential channel and the external flow diversion surfaces extend.

In one embodiment, the first and second interior walls of the interior circumferential channel are substantially parallel to one another. By "substantially parallel" is meant that the angle formed between each interior wall and the bottom interior wall, at a cross-section of the interior circumferential channel, is in the range from about 85 degrees to about 95 degrees, for example 85, 86, 87, 88, 89, 90, 91, 92, 93, 94, or 95 degrees. In another embodiment, the first and second interior walls are not substantially parallel to one another, and the angle between each interior wall and the bottom interior wall is less than about 84 degrees, for example in the range of from about 45 degrees to about 84 degrees, or greater than about 96 degrees, for example in the range from about 96 degrees to about 135 degrees, and the difference between the angles is at least 10 degrees. As used herein, the term "angle formed between each interior wall and the bottom interior wall" means the angle formed at the contact of the first interior wall with the bottom interior wall and the angle formed at the contact of the second interior wall with the bottom interior wall, as viewed in a planar cross-section of the interior circumferential channel, for example as shown in FIG. 2 and FIG. 3.

The bottom interior wall forms the bottom of the interior circumferential channel. In one embodiment, the bottom interior wall has a planar surface. In another embodiment, the bottom interior wall has a concave surface. Optionally, the bottom interior wall may have another type of surface, as long as the surface does not negatively affect the functioning of the spray nozzle.

The interior circumferential channel comprises a circumferential channel width, which is the distance between the first and second interior walls of the interior circumferential channel, measured in the direction orthogonal to the interior circumferential channel and across the bottom interior wall. Typically, the width of the interior circumferential channel is fixed, meaning the width remains the same and does not vary along the interior circumferential channel from the liquid inlet orifice to the ejector.

The annular head of the spray nozzle disclosed herein comprises an ejector. As shown in FIG. 4A, FIG. 4B, FIG. 5A, FIG. 5B, FIG. 6A, and FIG. 6B, the ejector 50 comprises a substantially smooth surface 70 having a fixed width, and extends from the point of contact 75 with the interior circumferential channel 45 such that, in the extending direction, the substantially smooth surface increases in distance from the bottom interior wall of the interior circumferential channel. At the point of contact with the interior circumferential channel, the surface of the ejector is flush and contiguous with the end of the interior circumferential channel. The substantially smooth surface of the ejector further comprises a distal edge 80 which is substantially parallel to the fixed width of the substantially smooth surface. The distal edge 80 is located at the end of the ejector opposite to the point of contact of the ejector with the interior circumferential channel. The distal edge is situated above the liquid inlet orifice, such that a circumferential flow of droplets is created as the scrubbing liquid flows through the spray nozzle. The distal edge 80 is substantially straight and free of any additional extending member or additional feature.

The ejector extends from the point of contact with the interior bottom wall of the interior circumferential channel such that in the extending direction, the substantially smooth surface increases in distance from the bottom interior wall of the interior circumferential channel. In one embodiment, the ejector extends in a straight line. In another embodiment, the ejector extends in a curved shape. The ejector further comprises a length. The length of the ejector, as measured from the point of contact of the ejector with the bottom interior wall of the interior circumferential channel to the distal edge of the substantially smooth surface of the ejector, can typically be in the range of from about 5 degrees to about 30 degrees of the circumference of the annular head of the nozzle.

The ejector comprises a substantially smooth surface. By "substantially smooth" is meant that the surface of the ejector has an even and regular surface free from perceptible projections, lumps, indentations, threading, or ridges of any type. In one embodiment, the substantially smooth surface of the ejector comprises a curved shape, for example a minor arc or a portion of a spiral. In another embodiment, the substantially smooth surface of the ejector comprises a planar shape, for example a square or a rectangle. In an additional embodiment, the substantially smooth surface of the ejector comprises a series of planar shapes, for example both squares and rectangles, arranged in alternating or random fashion. In yet another embodiment, the substantially smooth surface of the ejector comprises a combination of at least one curved shape and at least one planar shape, for example a planar shape at the point of contact with the interior circumferential channel, followed by a curved shape containing the distal edge of the ejector.

Figure 4A:
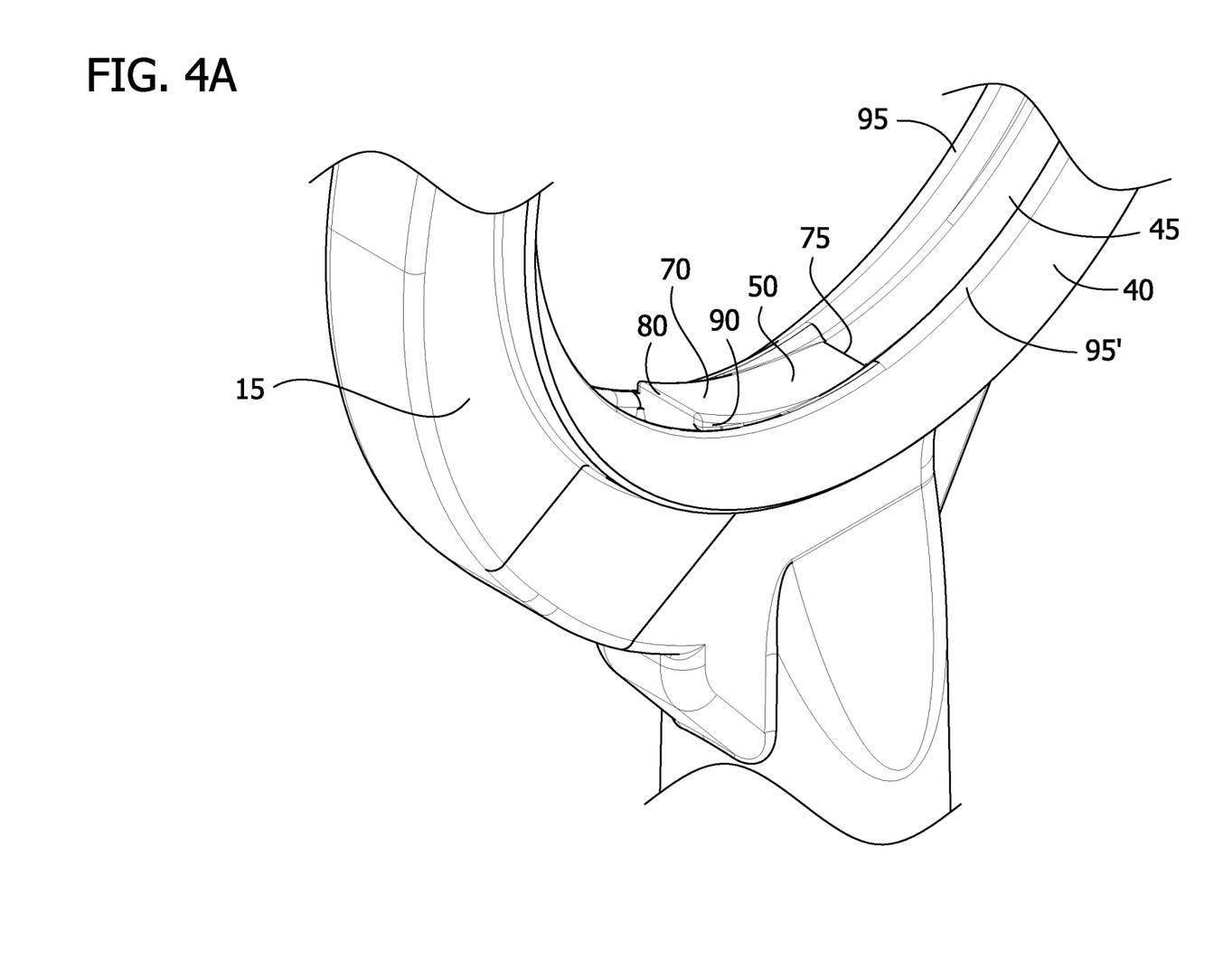
FIG. 4a is an anterior perspective view of a portion of one embodiment of a spray nozzle as disclosed herein.
Figure 4B:
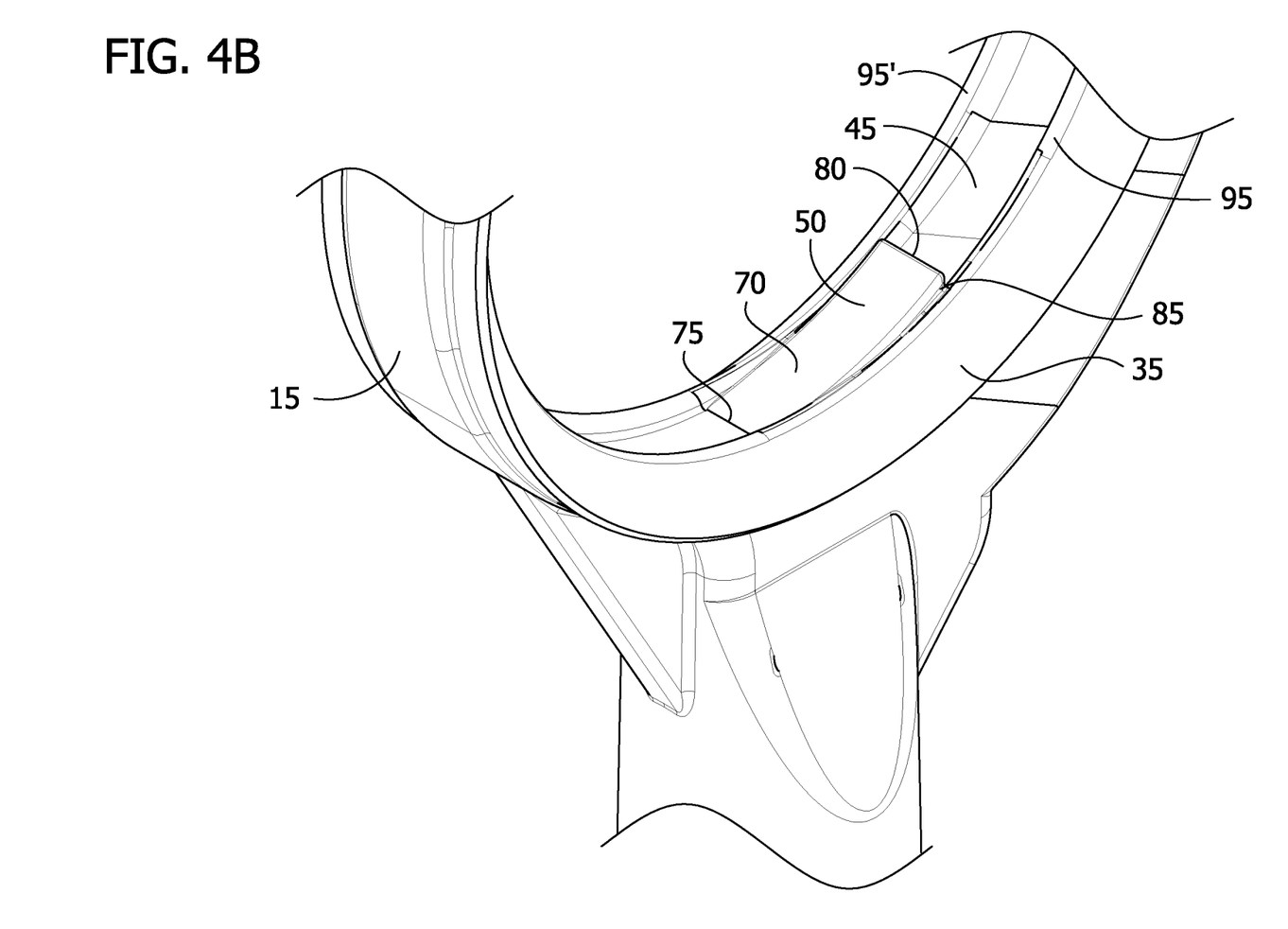
FIG. 4b is a posterior perspective view of a portion of one embodiment of a spray nozzle as disclosed herein.

The substantially smooth surface of the ejector has a fixed width, meaning that the width remains the same and does not vary along the length of the ejector. In one embodiment, the fixed width of the substantially smooth surface is at least half that of the circumferential channel width, for example at least about 50%, or about 55%, or about 60%, or about 65%, or about 70%, or about 75%, or about 80%, or about 85%, or about 90%, or about any value between 50% and 90%, of the circumferential channel width. In another embodiment, the fixed width of the substantially smooth surface is about the same as the circumferential channel width, meaning the fixed width of the substantially smooth surface is about 100% of the circumferential channel width. In a further embodiment, the fixed width of the substantially smooth surface is substantially the same as the circumferential channel width, for example about 91%, or about 92%, or about 93%, or about 94%, or about 95%, or about 96%, or about 97%, or about 98%, or about 99%, or about any value between 91% and 99%, of the circumferential channel width. The width of the substantially smooth surface can be measured at the point of contact with the interior circumferential channel or along the distal edge of the substantially smooth surface of the ejector. Referring to FIG. 4A and FIG. 4B, the ejector 50 further comprises a first side 85 (not shown in FIG. 4A) and a second side 90 (not shown in FIG. 4B), each side extending continuously from the edges of the substantially smooth surface 70 to the first and the second external flow diversion surfaces 35 and 40, respectively. In one embodiment, each side of the ejector extends from the substantially smooth surface to the first and to the second external flow diversion surfaces. In another embodiment, each side of the ejector extends to the bottom interior wall of the interior circumferential channel. The first and second sides of the ejector may each be smooth, inclined, radiused, or feathered. By inclined is meant that the first and second sides of the ejector are sloped in a plane between the substantially smooth surface and the external flow diversion surfaces. By radiused is meant that the first and second sides of the ejector are rounded or curved, for example concave or convex. By feathered is meant that the first and second sides of the ejector are irregularly curved. In one embodiment, the first and second sides are each smooth. In one embodiment, the first and second sides are each inclined. In an additional embodiment, the first and second sides are each radiused. In yet another embodiment, the first and second sides are each feathered. In some embodiments, the first side is inclined and the second side is radiused or feathered. In some embodiments, the first side is radiused, and the second side is inclined or feathered. In some embodiments, the first side is feathered, and the second side is inclined or radiused.

In one embodiment, the distal edge 80 of the substantially smooth surface 70 of ejector 50 is situated above the nearer edges 95 and 95' of external flow diversion surfaces 35 and 40, respectively, as shown in FIG. 4A and FIG. 4B. FIG. 4A and FIG. 4B are anterior and posterior views, respectively, of a portion of one embodiment of a spray nozzle as disclosed herein. In each of FIGS. 4A and 4B, only one of the external flow diversion surfaces is shown, and the point of contact 75 of the ejector 50 with the interior circumferential channel 45, as well as the annular head 15, are indicated. In this embodiment, the distance from the distal edge to the bottom interior wall of the interior circumferential channel, measured in a direct line, is greater than the depth of the interior circumferential channel at that location.

Figure 5A:
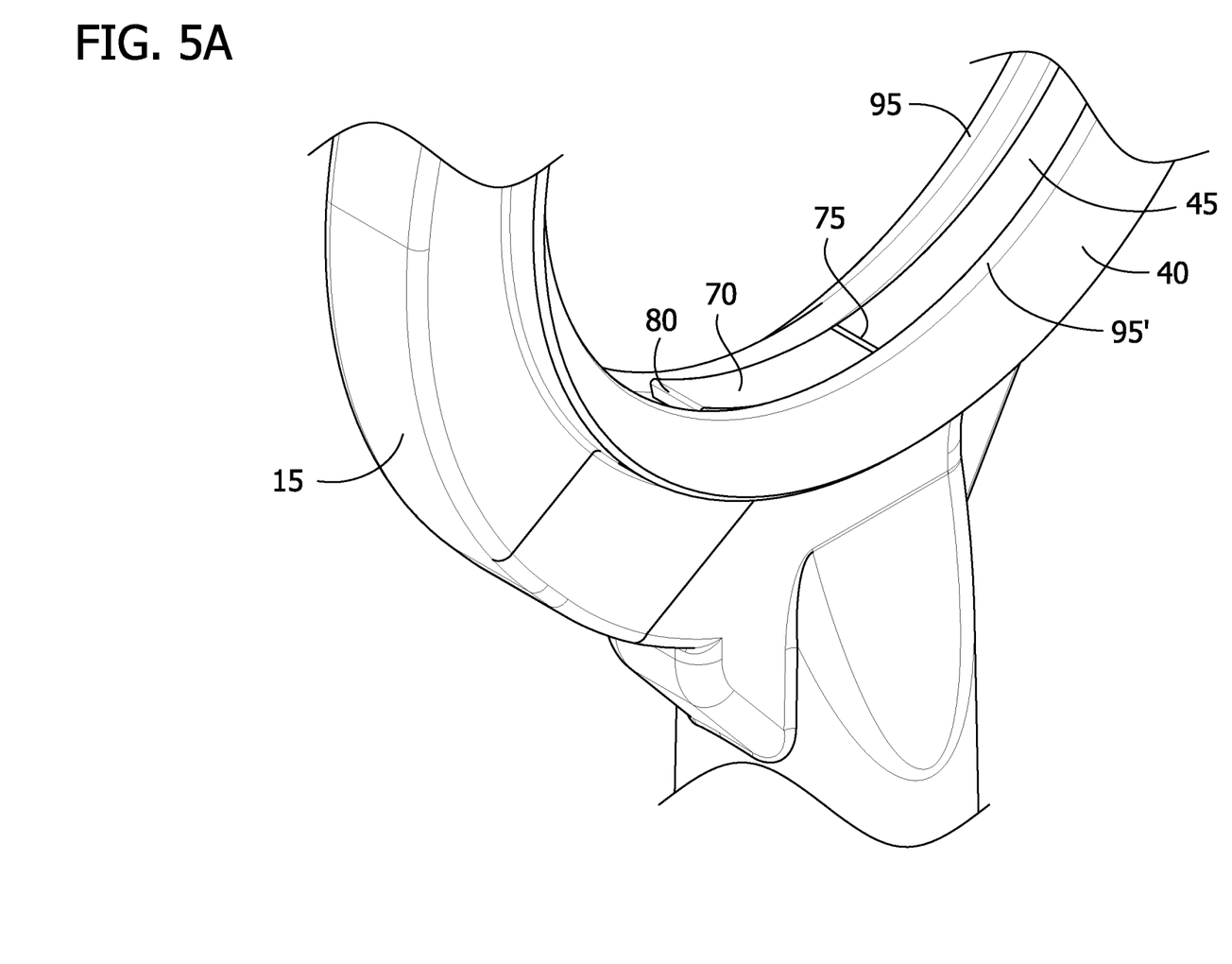
FIG. 5a is an anterior perspective view of a portion of one embodiment of a spray nozzle as disclosed herein.
Figure 5B:
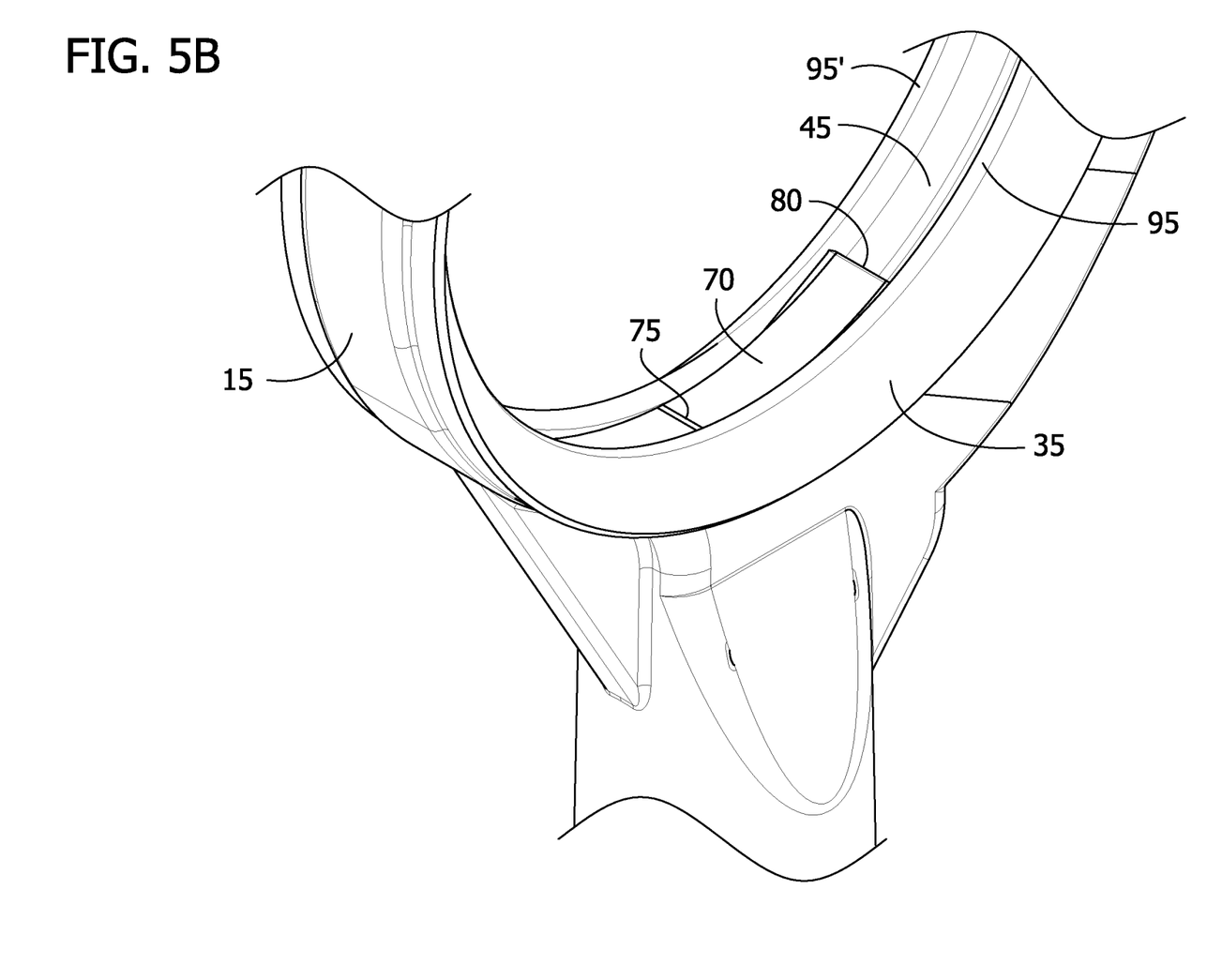
FIG. 5b is a posterior perspective view of a portion of one embodiment of a spray nozzle as disclosed herein.

In another embodiment, the distal edge 80 of the substantially smooth surface 70 is situated about even with the nearer edges 95 and 95' of external flow diversion surfaces 35 and 40, respectively, as shown in FIG. 5A and FIG. 5B. FIG. 5A and FIG. 5B, are anterior and posterior views, respectively, or a portion of one embodiment of a spray nozzle as disclosed herein. In each of FIG. 5A and FIG. 5B, only one of the external flow diversion surfaces is shown, and the point of contact 75 of the ejector with the interior circumferential channel 45, as well as the annular head 15, are indicated. In this embodiment, the distance from the distal edge to the bottom wall of the interior circumferential channel, measured in a direct line, is about the same as the depth of the interior circumferential channel at that location.

Figure 6A:
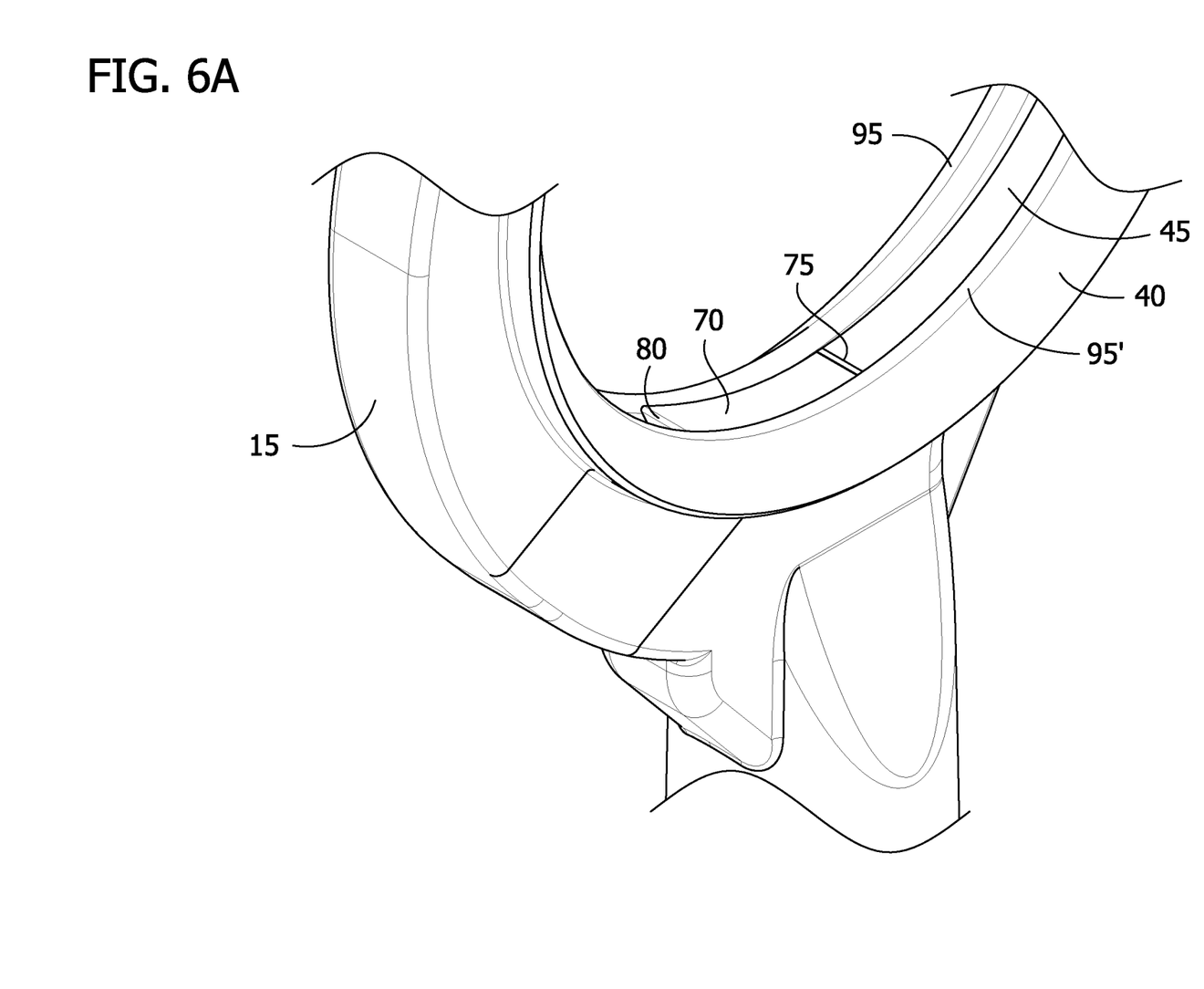
FIG. 6a is an anterior perspective view of a portion of one embodiment of a spray nozzle as disclosed herein.
Figure 6B:
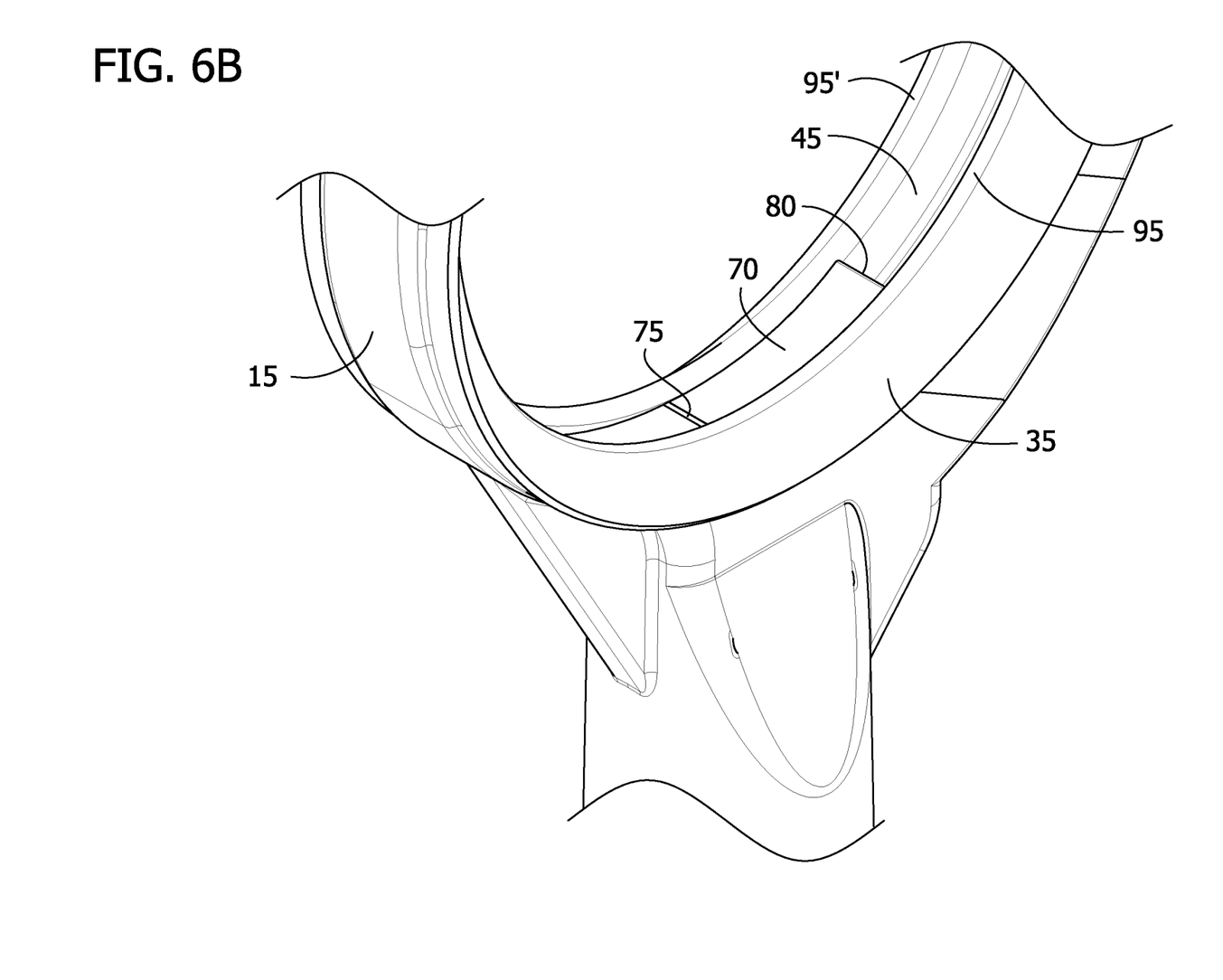
FIG. 6b is a posterior perspective view of a portion of one embodiment of a spray nozzle as disclosed herein.

In yet another embodiment, the distal edge 80 of the substantially smooth surface 70 is situated below the nearer edges 95 and 95' of external flow diversion surfaces 35 and 40, respectively, as shown in FIG. 6A and FIG. 6B. FIG. 6A and FIG. 6B are anterior and posterior views, respectively, of a portion of one embodiment of a spray nozzle as disclosed herein. In each of FIG. 6A and FIG. 6B, only one of the external flow diversion surfaces is shown, and the point of contact 75 of the ejector with the interior circumferential channel 45, as well as the annular head 15, are indicated. In this embodiment, the distance from the distal edge to the bottom interior wall of the interior circumferential channel, measured in a direct line, is less than the depth of the interior circumferential channel at that location.

In one embodiment of a spray nozzle as disclosed herein, the ejector comprises a substantially smooth surface having a fixed width, and further comprises a first side and a second side, and the substantially smooth surface of the ejector comprises a curved shape, a planar shape, a series of planar shapes, or a combination thereof, and further comprises a distal edge substantially parallel to the fixed width of the substantially smooth surface.

In one embodiment, the ejector consists essentially of a substantially smooth surface having a fixed width, a first side and a second side, and the substantially smooth surface of the ejector comprises a curved shape, a planar shape, a series of planar shapes, or a combination thereof, and further comprises a distal edge substantially parallel to the fixed width of the substantially smooth surface.

In one embodiment, the ejector comprises a substantially smooth surface having a fixed width, and further comprises a first side and a second side, and the substantially smooth surface of the ejector consists essentially of a curved shape, a planar shape, a series of planar shapes, or a combination thereof, and a distal edge substantially parallel to the fixed width of the substantially smooth surface.

In one embodiment, the ejector consists essentially of a substantially smooth surface having a fixed width, a first side and a second side, and the substantially smooth surface of the ejector consists essentially of a curved shape, a planar shape, a series of planar shapes, or a combination thereof, and a distal edge substantially parallel to the fixed width of the substantially smooth surface.

Spray nozzles as disclosed herein are useful in an apparatus for conditioning gases or for controlling emissions of acidic gases, particulates, or both acidic gases and particulates from flue gas. The apparatus, for example a wet scrubber, may comprise at least one spray nozzle as disclosed herein, and typically comprises a plurality of spray nozzles situated in one or more locations within the apparatus.

Generally, a wet scrubber is a type of gas pollution control device, which is used to remove fine particles and/or gaseous impurities from industrial exhaust streams. Wet scrubbers have been described in U.S. Pat. No. 7,534,400, WO2008/100317, and US2016/0317964, the disclosures of which are incorporated herein by reference in their entirety for all purposes. The wet scrubber comprises a gas inlet for receiving the gas stream to be treated (such as a flue gas generated from a petroleum, power, or petrochemical plant) into the wet scrubber and a scrubbed gas outlet for discharging the cleaned wet gas stream from the wet scrubber. Typically, a wet scrubber is a gas-liquid contacting device comprising at least one scrubbing zone where the gas stream to be treated contacts an aqueous scrubbing liquid. In some embodiments, the cooled hot gas stream is contacted with a scrubbing liquid to be adiabatically saturated or "quenched" in a scrubbing zone in the wet scrubber. In some embodiment, the scrubbing liquid is an aqueous solution comprising a basic reagent and having a pH of at least about 8.5. In some embodiments, the wet scrubber is a BELCO® wet scrubber. A BELCO® wet scrubbing system has been described by Weaver et al. in "An Update of Wet Scrubbing Control Technology for FCCUS-Multiple Pollutant Control" AM-03-120, NPRA Annual Meeting, (2003), the disclosure of which is incorporated herein by reference in its entirety for all purposes.

In some embodiments, the wet scrubber is a reverse jet scrubber wherein at least one jet of an aqueous scrubbing liquid contacts the cooled hot gas stream countercurrently in a scrubbing zone. In some embodiments, the wet scrubber is equipped with a plurality of spray nozzles each of which sprays an aqueous scrubbing liquid substantially horizontally towards the interior wall of a scrubbing zone and produces high density aqueous scrubbing liquid curtains through which the cooled hot gas stream passes in a cross-flow fashion. In some embodiments, the wet scrubber is a reverse jet scrubber such as a DyneWave® reverse jet scrubber. A reverse jet scrubber has been described in U.S. Pat. No. 3,803,805, the disclosure of which is incorporated herein by reference in its entirety for all purposes.

Depending on the diameter of the tower of the wet scrubber or the inlet to the tower, spray nozzles as disclosed herein typically may be located at or close to the center of the chamber interior when a single nozzle is used; when several nozzles are used at each level, the nozzles may be placed between the center of the tower and the interior wall of the tower. The number of nozzles, and the number of layers of nozzles, are a function of the size of the wet scrubber, the amount of liquid spray required to be pumped into each nozzle, and the temperature of the flue gas entering the wet scrubber.

In a first embodiment, the present disclosure is directed to a process for conditioning gases from flue gas, the process comprising using at least one spray nozzle as disclosed herein. In another embodiment, the present disclosure is directed to a process for controlling emissions of acidic gases, particulates, or both acidic gases and particulates from flue gas, the process comprising using at least one spray nozzle as disclosed herein. In an additional embodiment, the present disclosure is directed to a wet scrubbing process for conditioning gases or for controlling emissions of acidic gases, particulates, or both acidic gases and particulates from flue gas, the process comprising using at least one spray nozzle as disclosed herein.

In the foregoing specification, the concepts have been described with reference to specific embodiments. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of invention.

It is to be appreciated that certain features which are, for clarity, described herein in the context of separate embodiments, may also be provided in combination in a single embodiment. Conversely, various features that are, for brevity, described in the context of a single embodiment, may also be provided separately or in any subcombination.

Non-limiting examples of the embodiments disclosed herein include:

1. A spray nozzle comprising:
   (a) an annular head comprising a liquid inlet orifice, a first external flow diversion surface, a second external flow diversion surface, an interior circumferential channel, and an ejector,
   wherein the first and second external flow diversion surfaces each comprise a conical frustum shape;
   wherein the interior circumferential channel is disposed between the first and second external flow diversion surfaces and extends from the liquid inlet orifice to the ejector, the interior circumferential channel comprising a first interior wall, a second interior wall opposite the first interior wall, a bottom interior wall, a circumferential channel width, and a continuously reducing depth from the liquid inlet orifice to the ejector, and
   wherein the ejector comprises a substantially smooth surface having a fixed width, the ejector extending from the point of contact with the interior circumferential channel such that in the extending direction, the substantially smooth surface increases in distance from the interior circumferential channel;
   (b) a hollow neck; and
   (c) a liquid inlet line disposed in the hollow neck and in fluid communication with the liquid inlet orifice.

2. The spray nozzle of embodiment 1, wherein the fixed width of the substantially smooth surface is at least half that of the circumferential channel width.

3. The spray nozzle of embodiment 1, wherein the fixed width of the substantially smooth surface is the same or substantially the same as the circumferential channel width.

4. The spray nozzle of any one of embodiments 1, 2, or 3, wherein the substantially smooth surface of the ejector comprises a curved shape, a planar shape, a series of planar shapes, or a combination thereof.

5. The spray nozzle of any one of embodiments 1, 2, 3, or 4, wherein the substantially smooth surface of the ejector further comprises a distal edge substantially parallel to the fixed width of the substantially smooth surface.

6. The spray nozzle of any one of embodiments 1, 2, 3, 4, or 5, wherein the first and second external flow diversion surfaces each further comprise a nearer edge situated along the interior circumferential channel, and wherein the distal edge is situated about even with the nearer edge of at least one external flow diversion surface.

7. The spray nozzle of any one of embodiments 1, 2, 3, 4, or 5, wherein the first and second external flow diversion surfaces each further comprise a nearer edge situated along the interior circumferential channel, and wherein the distal edge is situated below the nearer edge of at least one external flow diversion surface.

8. The spray nozzle of any one of embodiments 1, 2, 3, 4, or 5, wherein the first and second external flow diversion surfaces each further comprise a nearer edge situated along the interior circumferential channel, and wherein the distal edge is situated above the nearer edge of at least one external flow diversion surface.

9. The spray nozzle of any one of embodiments 1, 2, 3, 4, 5, 6, 7, or 8, wherein the ejector further comprises a first side and a second side, each side extending from the substantially smooth surface to the first or the second external flow diversion surface or to the bottom interior wall of the interior circumferential channel, and wherein the first and second sides are each smooth, inclined, or radiused.

10. The spray nozzle of any one of embodiments 1, 2, 3, 4, 5, 6, 7, 8, or 9, wherein the ejector is disposed above the liquid inlet orifice.

11. The spray nozzle of any one of embodiments 1, 2, 3, 4, 5, 6, 7, 8, 9, or 10, wherein the first and second interior walls of the interior circumferential channel are substantially parallel to one another.

12. The spray nozzle of any one of embodiments 1, 2, 3, 4, 5, 6, 7, 8, 9, or 10, wherein the first and second interior walls of the interior circumferential channel are not substantially parallel to one another.

13. The spray nozzle of any one of embodiments 1, 2, 3, 4, 5, 6, 7, 8, 9, 10, 11, or 12, wherein the first and second external flow diversion surfaces are symmetrical to each other.

14. The spray nozzle of any one of embodiments 1, 2, 3, 4, 5, 6, 7, 8, 9, 10, 11, 12, or 13, wherein the first and second external flow diversion surfaces are each disposed along the entire circumference of the annular head.

15. The spray nozzle of any one of embodiments 1, 2, 3, 4, 5, 6, 7, 8, 9, 10, 11, 12, 13, or 14, wherein the hollow neck comprises a mating region.

16. A spray nozzle comprising:
(a) an annular head, the annular head comprising:
 (i) a liquid inlet orifice;
 (ii) a first external flow diversion surface and a second external flow diversion surface;
 (iii) an interior circumferential channel; and
 (iv) an ejector;
(b) a hollow neck; and
(c) a liquid inlet line disposed in the hollow neck and in fluid communication with the liquid inlet orifice;
wherein
 both the first and second external flow diversion surfaces are disposed along the entire circumference of the annular head and each external flow diversion surface comprises a conical frustum shape symmetrical to the other;
 the interior circumferential channel is disposed between the first and second external flow diversion surfaces and extends from the liquid inlet orifice to the ejector, the interior circumferential channel comprising a first interior wall, a second interior wall opposite the first interior wall, and a bottom interior wall, a circumferential channel width, and a continuously reducing depth from the liquid inlet orifice to the ejector; and
 the ejector is disposed above the liquid inlet orifice and comprises a substantially smooth surface having a curved shape and a fixed width the same as or substantially the same as the circumferential channel width, the ejector extending from the point of contact with the interior circumferential channel such that in the extending direction the substantially smooth surface increases in distance from the interior circumferential channel.

17. An apparatus for conditioning gases or for controlling emissions of acidic gases, particulates, or acidic gases and particulates from flue gas, the apparatus comprising at least one spray nozzle, wherein the spray nozzle is a spray nozzle of embodiment 1, 2, 3, 4, 5, 6, 7, 8, 9, 10, 11, 12, 13, 14, 15, or 16.

18. The apparatus of embodiment 17, wherein the apparatus is a wet scrubber.

19. A process for conditioning gases or for controlling emissions of acidic gases, particulates, or acidic gases and particulates from flue gas, the process comprising using at least one spray nozzle, wherein the spray nozzle is a spray nozzle of embodiment 1, 2, 3, 4, 5, 6, 7, 8, 9, 10, 11, 12, 13, 14, 15, or 16.

What is claimed is:

1. A spray nozzle comprising:
(a) an annular head comprising a liquid inlet orifice, a first external flow diversion surface, a second external flow diversion surface, an interior circumferential channel, and an ejector,
 wherein the first and second external flow diversion surfaces each comprise a conical frustum shape;
 wherein the interior circumferential channel is disposed between the first and second external flow diversion surfaces and extends from the liquid inlet orifice to the ejector, the interior circumferential channel comprising a first interior wall, a second interior wall opposite the first interior wall, a bottom interior wall, a circumferential channel width, and a continuously reducing depth from the liquid inlet orifice to the ejector, and
 wherein the ejector comprises a substantially smooth surface having a fixed width, the ejector extending from the point of contact with the interior circumferential channel such that in the extending direction, the substantially smooth surface increases in distance from the interior circumferential channel;
(b) a hollow neck; and
(c) a liquid inlet line disposed in the hollow neck and in fluid communication with the liquid inlet orifice.

2. The spray nozzle of claim 1, wherein the fixed width of the substantially smooth surface is at least half that of the circumferential channel width.

3. The spray nozzle of claim 1, wherein the fixed width of the substantially smooth surface is the same or substantially the same as the circumferential channel width.

4. The spray nozzle of claim 1, wherein the substantially smooth surface of the ejector comprises a curved shape, a planar shape, a series of planar shapes, or a combination thereof.

5. The spray nozzle of claim 1, wherein the substantially smooth surface of the ejector further comprises a distal edge substantially parallel to the fixed width of the substantially smooth surface.

6. The spray nozzle of claim 5, wherein the first and second external flow diversion surfaces each further comprise a nearer edge situated along the interior circumferential channel, and wherein the distal edge is situated about even with the nearer edge of at least one external flow diversion surface.

7. The spray nozzle of claim 5, wherein the first and second external flow diversion surfaces each further comprise a nearer edge situated along the interior circumferential channel, and wherein the distal edge is situated below the nearer edge of at least one external flow diversion surface.

8. The spray nozzle of claim 5, wherein the first and second external flow diversion surfaces each further comprise a nearer edge situated along the interior circumferential channel, and wherein the distal edge is situated above the nearer edge of at least one external flow diversion surface.

9. The spray nozzle of claim 1, wherein the ejector further comprises a first side and a second side, each side extending from the substantially smooth surface to the first or the second external flow diversion surface or to the bottom interior wall of the interior circumferential channel, and wherein the first and second sides are each smooth, inclined, or radiused.

10. The spray nozzle of claim 1, wherein the ejector is disposed above the liquid inlet orifice.

11. The spray nozzle of claim 1, wherein the first and second interior walls of the interior circumferential channel are substantially parallel to one another.

12. The spray nozzle of claim 1, wherein the first and second interior walls of the interior circumferential channel are not substantially parallel to one another.

13. The spray nozzle of claim 1, wherein the first and second external flow diversion surfaces are symmetrical to each other.

14. The spray nozzle of claim 1, wherein the first and second external flow diversion surfaces are each disposed along the entire circumference of the annular head.

15. The spray nozzle of claim 1, wherein the hollow neck comprises a mating region.

16. An apparatus for conditioning gases or for controlling emissions of acidic gases, particulates, or acidic gases and particulates from flue gas, the apparatus comprising at least one spray nozzle of claim 1.

17. The apparatus of claim 16, wherein the apparatus is a wet scrubber.

18. A process for conditioning gases or for controlling emissions of acidic gases, particulates, or acidic gases and particulates from flue gas, the process comprising using at least one spray nozzle of claim 1.

19. A spray nozzle comprising:
(a) an annular head, the annular head comprising:
    (i) a liquid inlet orifice;
    (ii) a first external flow diversion surface and a second external flow diversion surface;
    (iii) an interior circumferential channel; and
    (iv) an ejector;
(b) a hollow neck; and
(c) a liquid inlet line disposed in the hollow neck and in fluid communication with the liquid inlet orifice;
wherein
both the first and second external flow diversion surfaces are disposed along the entire circumference of the annular head and each external flow diversion surface comprises a conical frustum shape symmetrical to the other;
the interior circumferential channel is disposed between the first and second external flow diversion surfaces and extends from the liquid inlet orifice to the ejector, the interior circumferential channel comprising a first interior wall, a second interior wall opposite the first interior wall, and a bottom interior wall, a circumferential channel width, and a continuously reducing depth from the liquid inlet orifice to the ejector; and
the ejector is disposed above the liquid inlet orifice and comprises a substantially smooth surface having a curved shape and a fixed width the same as or substantially the same as the circumferential channel width, the ejector extending from the point of contact with the interior circumferential channel such that in the extending direction the substantially smooth surface increases in distance from the interior circumferential channel.

\* \* \* \* \*